United States Patent [19]
Kim et al.

[11] 3,906,073
[45] Sept. 16, 1975

[54] METHODS OF MAKING NETWORK STRUCTURES

[75] Inventors: Charles W. Kim, Wilmington; Chia-Seng Liu, Newark; Lawrence J. Logan, Jr., Wilmington, all of Del.

[73] Assignee: Hercules Incorporated, Wilmington, Del.

[22] Filed: July 5, 1973

[21] Appl. No.: 376,837

[52] U.S. Cl............ 264/147; 28/DIG. 1; 264/210 R; 264/289; 264/DIG. 47
[51] Int. Cl.² ........................................... B29H 7/18
[58] Field of Search .... 264/141, 147, 167, DIG. 47, 264/140, 289, 210 R; 161/402; 57/140 R; 156/167, 209, 219, 181; 28/1, 71.3; 425/363, 396, 369, 66, 327, 324, 328

[56] References Cited
UNITED STATES PATENTS

| | | | |
|---|---|---|---|
| 2,327,087 | 8/1943 | Austin | 264/141 |
| 3,350,491 | 10/1967 | Rasmussen | 264/288 |
| 3,354,253 | 11/1967 | Rasmussen | 264/288 |
| 3,491,185 | 1/1970 | Rasmussen | 264/288 |
| 3,672,013 | 6/1972 | Vernon et al. | 28/71.3 |
| 3,673,032 | 6/1972 | Komoly | 264/167 |
| 3,682,760 | 8/1972 | Fairbanks | 161/402 |
| 3,697,636 | 10/1972 | Skoroszewski et al. | 264/DIG. 47 |
| 3,719,540 | 3/1973 | Hall | 156/167 |
| 3,724,198 | 4/1973 | Kim | 57/140 R |
| 3,746,607 | 7/1973 | Harmon et al. | 161/402 |

*Primary Examiner*—Jay H. Woo
*Attorney, Agent, or Firm*—Stanley A. Becker

[57] ABSTRACT

Methods of making network structures include forming in a sheet of crystallizable thermoplastic polymer a plurality of parallel continuous ribs interconnected by webs of reduced thickness at an angle diagonal to the longitudinal axis of the sheet. After forming the ribs, the polymer is crystallized to at least a 30% crystalline content. In this manner, and by forming the ribs at prescribed angles and by controlling the thickness of the ribs with respect to the webs, it is possible to spontaneously open the ribbed sheet into a network structure having continuous filaments by drawing without any mechanical fibrillation.

7 Claims, 10 Drawing Figures

METHODS OF MAKING NETWORK STRUCTURES

BACKGROUND OF THE INVENTION

This invention relates to improved methods for making network structures, and particularly to methods for making network structures by embossing or forming continuous ribs at predetermined angles in a sheet of crystallizable thermoplastic polymer and crystallizing the polymer to at least a 30% crystalline content in order to permit spontaneous fibrillation or opening into a network structure upon drawing in at least one direction to provide a uniform open network structure having continuous filaments from side to side and having desirable strength characteristics.

In the manufacture of networks, it has previously been proposed to form continuous grooves in a plastic sheet so that by subjecting this sheet to the two steps of (1) stretching and (2) applying splitting forces by some mechanical means, the thin parts of the sheets are converted into fibrous areas connecting thicker rib areas. For example, see British Pat. No. 1,206,765 which discloses making a sheet having a pattern of unoriented or oriented transverse, longitudinal or crossing diagonal ribs interconnected by fibrous areas by first embossing a plastic sheet, then, second, orienting in one or more directions, and then, third, subjecting the sheet to one or more mechanical fibrillation steps to split the oriented thin areas of the sheets into fibrous areas. Another example is U.S. Pat. No. 3,724,198 which describes embossing a sheet with diagonal striations with the striations being formed at an angle diagonal to the transverse axis of the sheet, then drawing the sheet in the machine direction for orientation, while allowing the sheet to neck down, and then fibrillating to open the oriented film into a network structure. A separate fibrillation step is necessary on these prior art processes to convert the embossed sheet into a reticular structure. Use of mechanical fibrillation is more costly, more time-consuming and makes reproducing of uniform network structures more difficult than if spontaneous fibrillation is used. Additionally, mechanical fibrillation cannot always be used when ribs are formed at an angle to the longitudinal axis of the sheet. In U.S. Pat. No. 3,488,415, diagonal grooves are formed in opposite directions in both sides of a sheet to provide thinned areas where the grooves cross which split upon biaxial stretching. While no mechanical fibrillation is necessary, the networks made do not have continous filaments or ribs extending from side to side, but rather have thick bosses interconnected by fibrils. The thick bosses behave as discrete areas of reinforcement. Likewise, U.S. Pat. No. 3,441,638 discloses forming a plurality of non-connected depressions in a sheet, and stretching the sheet to split the material below the depressions. Again, the networks made in this manner do not have continuous filaments extending from side to side.

SUMMARY OF THE INVENTION

The subject invention relates to methods of making network structures by forming on one side of a sheet of a crystallizable thermoplastic polymer a plurality of parallel continuous ribs interconnected by webs of reduced thickness, with the ribs extending at an angle diagonal to the longitudinal axis of the sheet. The polymer is crystallized to at least a 30% crystalline content. The sheet is then drawn in at least one direction to both orient the sheet and to open the web areas to produce a network structure having continuous ribs or filaments extending from side to side without any additional mechanical fibrillation steps. By crystallizing the polymer, forming the ribs at prescribed angles with respect to the direction of initial draw, and by controlling the thickness and size of the ribs and webs within certain limits, spontaneous fibrillation can be achieved to open the ribbed sheet into a network by drawing and to effect orientation of the ribs substantially along their longitudinal axes. The process provides network structures having strength in the direction parallel to the continuous ribs and having good tear resistance in the direction across the ribs. These network structures are dimensionally stable, self-supporting and easy to handle.

In order for spontaneous fibrillation to occur, the ribbed pattern in the sheet must be formed such that the continuous diagonal ribs are within certain angular ranges. If the initial draw is in the machine direction (parallel to the longitudinal axis of the sheet), the ribs should be formed at an angle of between 45° and 70° from the machine direction of the sheet. If the initial draw is in the cross-machine direction, the ribs should be formed at an angle of between 45° and 70° from the cross-machine direction of the sheet. For angles outside of the aforementioned ranges, the sheet ordinarily either will not open into a reticular structure by spontaneous fibrillation, or very high levels of draw must be employed to effect such network formation. While high levels of draw are possible, they are not desirable. The relationship of the rib thickness to the web thickness is also important. The maximum thickness of the ribs should be at least three times the thickness of the webs between the ribs. Also, the cross-sectional area of the ribs should be at least twice the cross-sectional area of the webs between the ribs.

The subject process is particularly applicable to the formation of parallel continuous ribs in the sheet by embossing. The embossing may be effected in a number of ways. A preferred method is to feed the molten sheet coming from the extrusion die into the nip of two counter-rotating rolls, one having a pattern of helical grooves so as to incorporate the desired ribbed pattern into the sheet, and the other being a hard or resilient surface back-up roll. The separation of the rolls can be readily controlled by regulating the pressure between the rolls. One roll, preferably the grooved roll, or both the rolls, are cooled to a temperature at which the sheet will harden and crystallize after the desired pattern is embossed into it.

After the diagonal ribs are formed in the plastic sheet, the sheet is drawn at a temperature below the crystalline melting point of the polymer in a direction between 45° and 70° from the direction of the diagonal ribs. This drawing, which should be at least 2X, increasing the dimension of the sheet in the direction of draw at least twice, effects orientation of the webs with an increase in their widths and orientation of the ribs but with no substantial increase in their width. Furthermore, such drawing causes formation of a network structure spontaneously by separation of the webs into uniformly separated fibrous areas interconnecting the oriented ribs. If desired, a second draw in a direction perpendicular to the first, normally no more than 4X, can be carried out to effect further orientation and separation of the ribs.

The network structures made by the subject method have their ribs oriented substantially along their longitudinal axes with fibrils interconnecting the ribs being oriented substantially along their longitudinal axes. If a single draw is used, the longitudinal axes of the fibrils are within about 0° and 20° from the direction of draw. If a subsequent draw in the perpendicular direction is employed, the angle between the longitudinal axes of the fibrils and the initial direction of draw becomes even greater. The level of orientation between the ribs and the webs is generally different, with the webs being more highly oriented and the direction of orientation being different. This makes for a dimensionally stable fabric having good tear strength in a direction across the ribs and good tensile strength in the direction of the ribs.

Other advantages of the present invention will be apparent from the following detailed description of the invention when considered in conjunction with the following detailed drawings, which drawings form a part of the specification. It is to be noted that the drawings illustrate only typical embodiments of the invention and are therefore not to be considered limiting of its scope, for the invention may admit to other equally effective embodiments.

DESCRIPTION OF THE INVENTION

Figure 1:
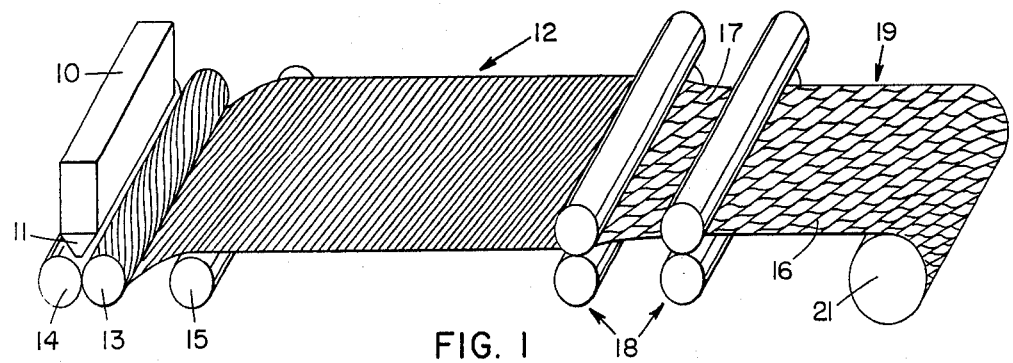
FIG. 1 is a perspective view illustrating apparatus for making network structures in accordance with the principles of this invention.
Figure 2:
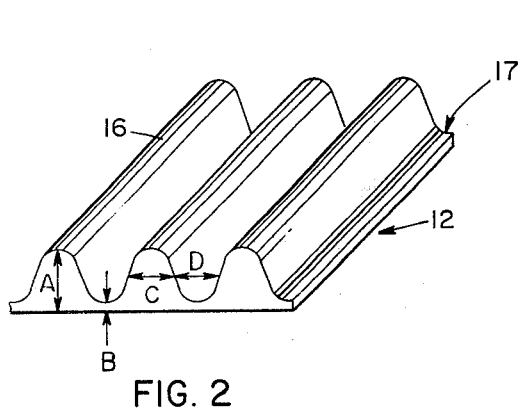
FIG. 2 is an enlarged perspective view of a portion of an embossed sheet shown in FIG. 1.

Referring to FIG. 1, there is shown an extruder generally designated as 10 and a split die 11 for forming a sheet 12 of a molten thermoplastic crystallized polymer. The sheet 12 passes between an embossing roll 13 and a back-up or casting roll 14. The embossing roll 13 has a pattern of helical grooves formed therein for forming a plurality of ribs in the advancing sheet 12 at an angle to the longitudinal axis of the sheet, hereinafter called the machine direction. The ribs 16 are interconnected by webs 17 of reduced thickness as shown more clearly in FIG. 2 by the enlarged portion of the embossed sheet. The casting roll 14 is positioned opposite the embossing roll and rotates in a direction opposite to the direction of the embossing roll 13 so that the sheet 12 advances forward. The embossed diagonally ribbed sheet is cooled and hardened by contact with the embossing and casting rolls 13 and 14, either one or both of which are cooled. The rolls 13 and 14 thus serve to quench, solidify and cause crystallization of the molten plastic sheet with the desired diagonally ribbed patterns. To subsequently obtain spontaneous fibrillation of the sheet upon drawing, it is desirable that the polymer be crystallized to at least a 30% crystalline content. To achieve the proper crystalline structure, the plastic sheet should remain in contact with one of the chilled rolls for a predetermined period of time, probably at least about 0.1 second. Expressed alternatively, the sheet should be in contact with one of the rolls for at least ½ inch of travel in the linear direction from the nip between the rolls to insure effective embossing and crystallization of the polymer. Point contact of the sheet between the two rolls is usually not sufficient to obtain the needed crystalline structure. In FIG. 1, it is shown that the sheet is in contact with embossing roll 13 for a considerable distance, about one-half of the periphery, before advancing over a guide roll 15. Crystallization is usually indicated by the formation of a front line, which should form in the sheet while still in contact with one of the rolls. The roll temperatures may be maintained between 10°C. and 200°C., but preferably are maintained between 20°C. and 150°C. These temperatures should be adjusted for particular polymers, different thicknesses of the sheet, and the rate of advancement of the sheet in order to provide the desired crystallization of the sheet while in contact with the embossing roll.

Figure 3:
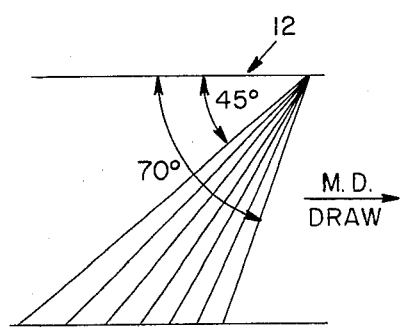
FIG. 3 is a view illustrating the angular range at which ribs can be formed in a sheet for initial draw in the machine direction.

When the initial draw is in the machine direction as shown in FIG. 1, the embossed sheet 12 advances through linear draw rolls generally designated as 18. For an initial machine direction draw, the diagonal ribs should be between about 45° and 70° from the machine direction or longitudinal axis of the sheet as illustrated in FIG. 3. The initial draw is an orienting draw of from about 2X to about 8X and serves the dual purpose of increasing the strength of the ribs 16 and of rendering the sheet so fissile in the web areas 17 between the ribs that the webs spontaneously open to form voids in a regular pattern, thus forming a network structure. When drawing in a linear direction, a large decrease in the width of the sheet, or necking, should be prevented to insure that the width of the ribs is not changed appreciably. This decrease in the width of the sheet can be minimized by maintaining relatively small distances between the various draw rolls. Temperature for drawing will vary, depending upon the polymer employed, but generally will be slightly lower than those employed for orienting flat sheets of the same polymer. For example, the temperatures typically may vary from about 70°C. to 140°C., with about 130°C. preferred for polypropylene and about 90°C. preferred for high density polyethylene. The open network structure generally indicated by 19 can then be wound on a take-up roll 21.

In order to obtain spontaneous fibrillation, the pattern of the ribbed sheet preferably is such that the thickness of the rib, measured perpendicular to the plane of the sheet, is appreciably greater than the thickness of the web. Referring again to FIG. 2, the dimension A which is the thickness of the rib 16, should be at least three times the dimension B which is the thickness of the web 17. The reason for this is that in the initial drawing operation, it is desired that the width C of the ribs change very little, so that the ribs lengthen and the orientation occurs primarily by a decrease in rib thickness. This is further facilitated by making the cross-sectional area of the ribs at least twice the cross-sectional area of the webs. Using the dimension D to represent the width of the web, this would allow the approximation that A times C should be at least twice B times D.

It is desirable that in drawing, a relatively high orientation level be imparted to the web area so that it splits easily while a lower orientation level may be imparted to the ribs. Additionally, it is desired that the ribs be oriented along their longitudinal axes for maximum strength, while the webs should be oriented at some angle to the longitudinal axes of the ribs. This different orientation of the webs, such as in a direction transverse or substantially transverse to the ribs, provides oriented fibrils which minimize tear propagation parallel to the ribs, thus improving the stability of the network structure.

To explain the spontaneous fibrillation more fully, when the ribbed sheet 12 is drawn in the machine direction, the webs 17 increase in width and become highly oriented while the ribs 16 increase in length and decrease their angular relationship with respect to the machine direction, thereby causing orientation of the ribs along their longitudinal axes. It can be seen in FIG. 1 that the angle of the ribs 16 shown therein changes from approximately 45° to the machine direction before draw, to about 30° to the machine direction after draw. By lengthening the ribs and orienting the webs substantially in the machine direction, shear stresses are created which result in spontaneous fibrillation. Thus, with the ribs formed at between 45° and 70° to the direction of draw, the webs are oriented at an angle to the ribs and the ribs are lengthened, causing the sufficient stresses to effect spontaneous fibrillation of the webs. It is to be noted that if the ribs are close to being transverse, or 90° to the machine direction, there may be very little lengthening of the ribs, resulting in very small shear forces which may be insufficient to cause spontaneous fibrillation. Similarly, if the ribs are close to being parallel to the machine direction, then the direction of lengthening the ribs and the direction in which the webs will become oriented are essentially the same and again there may be insufficient shearing forces to result in spontaneous fibrillation. It is believed that spontaneous fibrillation is attained by selecting certain angular relationships of the ribs to the draw direction, by selecting certain size relationships of the ribs to the webs, and by drawing to create sufficient shear forces between the ribs and the webs.

If desired, the extruded and embossed sheet 12 need not necessarily be drawn, oriented and spontaneously fibrillated immediately after embossing. Rather, the embossed film may be wound directly on a take-up roll and then at some latter time passed through a linear draw apparatus to effect the necessary orientation and opening into a network structure.

Figure 4:
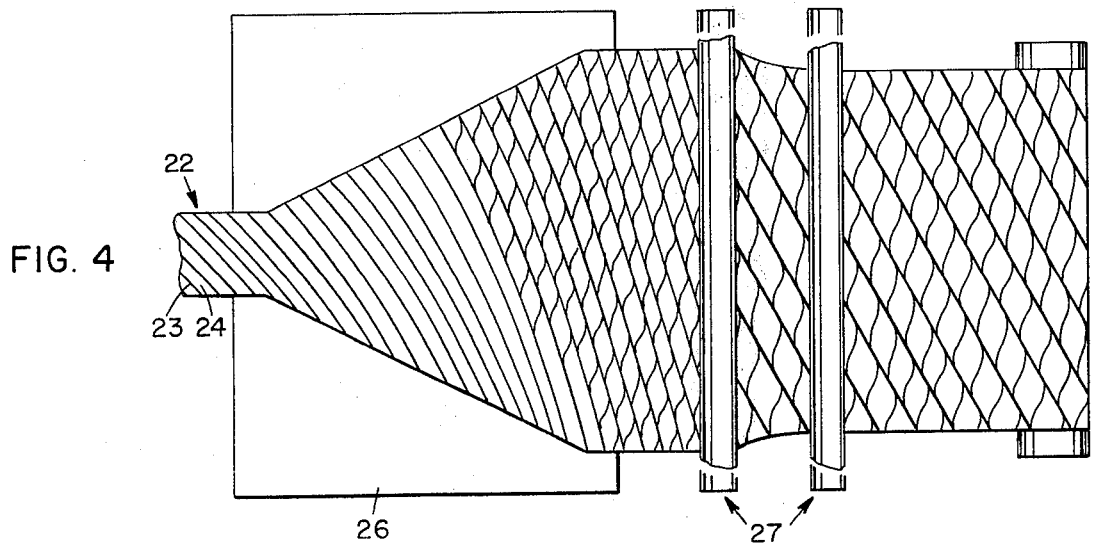
FIG. 4 is a plan view illustrating other apparatus which may be employed for making network structures in accordance with the principles of this invention.
Figure 5:
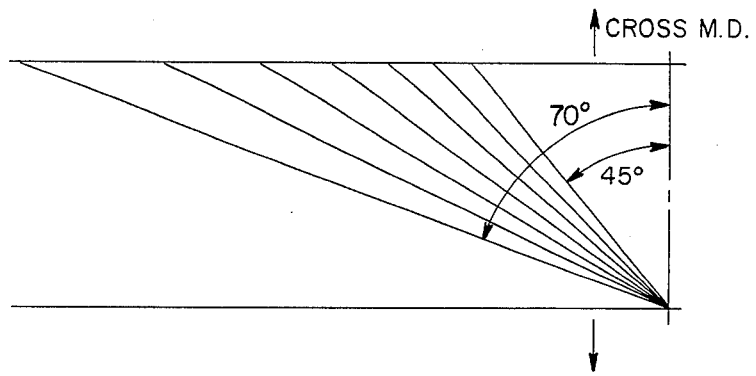
FIG. 5 is a view illustrating the angular range at which ribs can be formed in a sheet for initial draw in the cross-machine direction.

Referring to FIG. 4, there is shown apparatus for making network structures by initially drawing in the cross-machine direction. As previously described with reference to FIG. 1, a ribbed sheet 22 is formed, by embossing or the like, having angular ribs 23 interconnected by webs 24. The ribs 23 are formed at an angle different from those shown in FIG. 1 in order to make a network structure having continuous ribs which are formed close to the transverse direction of the sheet. For an initial cross-machine direction draw, the ribs should be formed at an angle of from between about 45° and 70° to the cross-machine direction as shown in FIG. 5. The ribbed sheet 23 is then advanced into a tenter 26 for stretching in the cross-machine direction from at least 2X to as high as 10X at draw temperatures as indicated above. During the tentering, the angle of the ribs 23 decreases with respect to the direction of draw. For example, a sheet with ribs formed at 45° to the cross-machine direction will change to about 26° to the cross-machine direction on drawing in a tenter at 2X, and into about 14° to the cross-machine direction on drawing at 4X.

An open network structure is spontaneously formed during the tentering operation. However, in some cases an additional draw, preferably in a direction perpendicular to the first draw, whether in the machine or cross-machine direction, may be desirable to further orient the ribs and to open the network structure further. This additional perpendicular draw serves to separate the oriented ribs 23 in the network structure and thus decrease the weight per unit area of the net. Such drawing is normally limited to about 4X and can be accomplished by linear draw rolls such as 27 in the case of an initial cross-machine direction draw as shown in FIG. 4.

Figure 6:
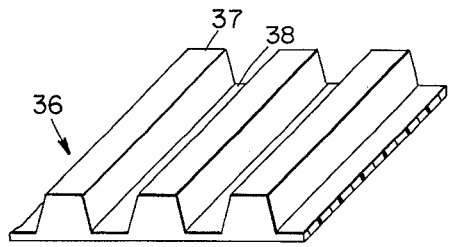
FIGS. 6, 7, 8 and 9 are perspective cross-sectional views of portions of embossed sheets illustrating some of the various rib patterns which can be utilized in the practice of this invention.
Figure 7:
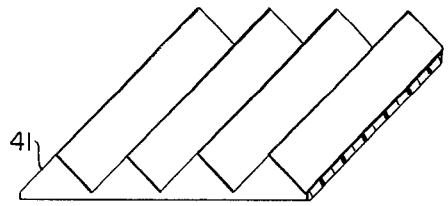
Figure 8:
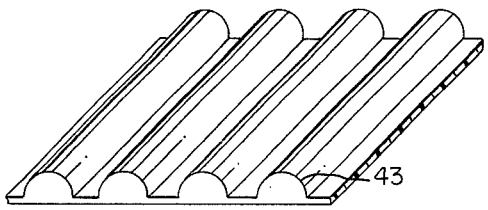
Figure 9:
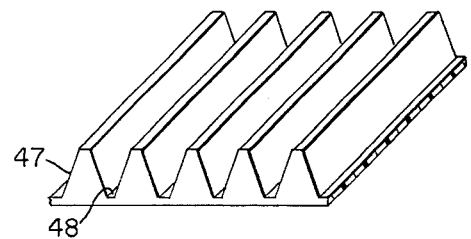

Referring now to FIG. 6, there is shown a sheet generally designated as 36 having ribs 37 which have a truncated cross-sectional shape, and webs 38. The thickness of the ribs 37 should be at least three times the thickness of the webs 38. Likewise, the cross-sectional area of the ribs 37 should be at least twice the cross-sectional area of the webs 38. FIGS. 6, 7, 8 and 9 illustrate that various shapes of ribs and webs can be employed. The cross-sectional shape of the ribs formed may vary. They may be semi-circular as shown by ribs 41 in FIG. 7, rectangular, triangular as shown by ribs 43 in FIG. 8, truncated as shown by ribs 37 in FIG. 7 or ribs 47 in FIG. 9, or any other desired shape. Likewise, various shapes and sizes of the webs separating the ribs may be utilized. The webs may be narrow so that the ribs are close together as illustrated by webs 48 in FIG. 9, or wide so that the ribs are more widely separated as illustrated by webs 38 of FIG. 6, but the webs should not oridinarily be wider than twice the width of the ribs.

Figure 10:
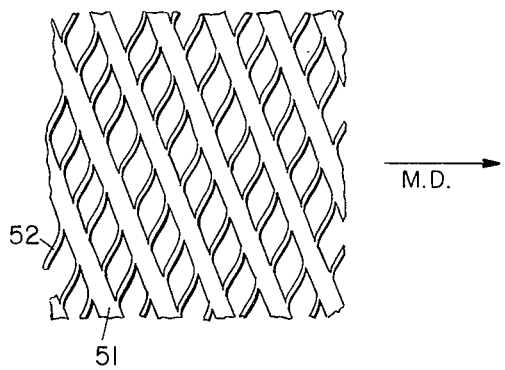
FIG. 10 is an enlarged plan view of a network structure made in accordance with the principles of this invention.

Referring to FIG. 10, there is shown a network structure 50 produced in accordance with the principles of this invention by initially drawing a sheet 4.5X in the cross-machine direction and then drawing 1.5X in the machine direction. The network structure 50 has a plurality of parallel continuous angular ribs 51 interconnected by fibrils 52. The ribs 51 are continuous in length from one side of the network to the other and are generally oriented substantially along their longitudinal axes. The fibrils 52, being formed from the webs, are thinner than the ribs 51 and are oriented more highly than the ribs 51 substantially in the direction of initial draw as previously described. These network structures are strong in the direction of the ribs 51 which reflects the degree and uniformity of orientation along the length of these ribs. This strength is lower in the opposite direction because of the smaller size of the interconnecting fibers or fibrils 52. The tear strength is high in the direction transverse to the ribs 51 again because of the strength of these ribs.

Multi-layer fabrics may be made from the subject network structures by bonding two or more layers together, preferably using layers having their ribs positioned in opposite directions to obtain high strength in more than one direction. It has been found that by preparing a laminate of the network structures described above in which the angle between the ribs in the two layers is between about 45° and 90°, the tear properties are improved to a surprising degree in all directions. Strength properties are also relatively balanced. Lamination of two or more layers can be effected easily with adhesives or by heat sealing, such as by the use of a conjugate material network structure, or by ultrasonic devices. Use of multiple layers or additional reinforcement such as by incorporation of continuous filaments in the warp directions are possible variations.

The materials from which the above network structures can be formed include any thermoplastic fiber-forming polymeric material which can be crystallized to a crystalline content of 30 percent or over. Among these, are medium density polyethylene, high density polyethylene, polypropylene homopolymer, random copolymers of propylene containing up to 10 percent of another olefin, block copolymers of propylene containing up to 25 percent of another olefin, poly(butene-1), poly(4-methylpentene-1), poly(ethylene terephthalate), poly(butylene terephthalate), nylon 6, and nylon 66. Mixtures of crystalline polymers with elastomeric polymers, or copolymers which have a total crystallinity of this level are also applicable. Up to about 30 percent of other additives such as pigments, fillers, die receptors and stabilizers may also be present. Conjugate or bi-component plastic sheets in which two or more different polymers are extruded together to form sheets containing layers of separate are also possible, provided the major portion is a polymer of the above description. Particularly desirable are conjugate plastic nets in which a lower melting component such as an amorphous polyamide or low density polyethylene is used to form a minor portion of the ribs. This permits lamination of two layers without adhesive by bonding with heat and pressure. Alloys or mixtures of polymers may also be employed.

Among the many uses of the subject network structures are, either as single or multi-layer fabrics, in sanitary napkins, diapers, incontinence pads, tampons, surgical dressings, surgical sponges, burn dressings, and reinforcing material for paper and paper products, films and other nonwovens and woven fabrics. For example, a network may be used to reinforce masking tape for wallpaper, thereby contributing increased tensile strength and tear resistance properties. In the case of paper and staple fiber non-wovens, the network structures having ribs at small angles to the cross-machine direction are particularly advantageous. This is because in preparing or making paper or staple fiber nonwovens, the fibers therein customarily become oriented in the machine direction and increased strength in the cross-machine direction, as well as increased tear resistance in the machine direction is needed. Additionally, the thermoplastic networks can be used as an adhesive in bonding other materials together under heat and pressure. They are also usable for fusible interliners in shirts and the like and can be used in place of cheesecloth in the manufacturing and processing of cheeses.

The principles of this invention are exemplified by the following examples, which are given to illustrate the invention and are not to be considered limiting in any way.

EXAMPLE 1

Polypropylene homopolymer with a melt flow of 2 was melt extruded at 270°C. at a rate of 25 pounds per hour through a flat slit die into the nip between a smooth chrome-plated steel roll and a steel embossing roll. The embossing roll was 12 inches long and 3 inches in diameter and had 25 grooves per inch on the surface at an angle of 45° to the roll axis. Each groove was rectangular, 25 mils wide and 20 mils deep and separated from each other by 15 mils. During the embossing operation both rolls were maintained at 20°–21°C., the film speed was 14 ft./min. and the nip pressure was 17 lbs./linear inch. After passing through the nip the film remained in contact with the embossing roll for 60° of rotation. The embossed film had a maximum thickness of 16 mils, a web thickness of 2 mils, a weight of 5.8 oz. per sq. yd., and was 39 % crystalline. This embossed film was drawn 4.5X in the cross-machine direction using a tenter at a temperature of 130°C. The film spontaneously opened into a network with the ribs at an angle of 78° to the machine direction, and the fibrils at an angle of 27° to the ribs. Both the ribs and fibrils were oriented substantially parallel to their respective longitudinal axes as shown by observation of birefringence bands in a polarizing microscope. It had a weight of 1.4 oz./sq. yd. The tensile strength in the cross-machine direction was 17 lbs./inch. Subsequently, the network was drawn 1.5X in the machine direction by passing it over a series of eleven heated rolls rotating at progressively higher speeds. After this linear draw, the network was more uniformly opened, weighed one ounce/sq. yd. and the ribs were at an angle of 60° to the machine direction of the network structure. The fibrils were at an angle of 67° to the ribs and both the ribs and fibrils were oriented substantially along their respective longitudinal axes. The tensile strength in the direction of the ribs was 17 lbs./inch and in the fibril or cross-filament direction was 1.0 lb./inch.

A roll of the same embossed film was also drawn 4.5X in the machine direction by passing it over a series of 11 closely spaced rolls heated to 125°C. rotating at progressively higher speeds. The film fibrillated spontaneously into a network structure with the ribs at an angle of 10° to the machine direction. The fibrils were at an angle of 25° to the ribs, and both the ribs and fibrils were oriented substantially along their respective longitudinal axes. The network had a weight of 1.6 oz./sq. yard and had a strength of 20 lbs./inch in the machine direction.

The network prepared by drawing 4.5X in the cross-machine direction and 1.5X in the machine direction was subsequently laminated to the network prepared by drawing 4.5X in the machine direction to form a fabric by keeping the machine directions parallel but turning over one network to obtain a fabric with the ribs in one layer crossing those in the other layer at an angle of 80°. The two networks were bonded together using a 0.5 oz./sq. yard high density polyethylene net between the layers by heating in a press with a platen temperature of 150°C. This fabric was 3.2 oz./sq. yard in weight, had a strength in the machine direction of 20 lbs./inch and in the cross-machine direction of 10 lbs./inch.

EXAMPLE 2

Polypropylene homopolymer with a melt flow of 4 was extruded at 260°C. using a 1½ inch extruder through a 18-inch flat slit film die. The polymer melt was passed into the nip between a 6 inch O.D. × 20 inch face smooth roll and a 4 inch O.D. × 15 inch face embossing roll with a 25 groove/inch engraved pattern at 20° from the roll axis. Both rolls were temperature controlled. The smooth roll temperature was 55°C. and the embossing roll temperature was 15°C. At a film speed of 6 ft./min. and 35 lbs./inch nip pressure, en embossed film was made with a rib thickness of 15 mils and a web thickness of 1.2 mil. After passing through the nip, the film adhered to the embossing roll for ½ inch of linear travel. It was 35% crystalline.

This film was linearly stretched 4X by passing over 11 closely spaced differential speed rolls at 120°C. roll temperature. The film spontaneously opened into a uniform network. The ribs had a 7 mil thickness, and were at an angle of 31° to the machine direction. The fibrils were at an angle of 39° to the ribs, and both the ribs and fibrils were oriented substantially along their respective longitudinal axes. The weight of the network was 1.6 oz./yard and the machine direction tensile strength was 15 lbs./inch.

EXAMPLE 3

High density polyethylene with a melt index of 6 and density of 0.96 was melt extruded at 204°C. using a 1½ inch extruder through an 18 inch slit film die. The polymer was passed into the nip between a 6 inch O.D. × 20 inch face smooth roll and a 4 inch O.D. × 15 inch face embossing roll with a 75 groove/inch engraved pattern at 20° from the roll axis. Both rolls were temperature controlled. The smooth roll temperature was 82°C. and the embossing roll temperature was 60°C. At a film speed of 21 ft./min. and 20 lbs./inch nip pressure, an embossed film was made with a rib thickness of 6.5 mils and a web thickness of 1.5 mils. The weight of the embossed film was 2.8 oz./yard, and it was 58% crystalline.

This film was linearly stretched 4X passing over 11 differential speed rolls at 100°C. temperature. The film spontaneously opened into a uniform network. The ribs had a thickness of 3.5 mils and were at an angle of 30° to the machine direction. The fibrils were at an angle of 37° to the ribs, and both the ribs and fibrils were oriented substantially along their respective longitudinal axes. The weight of the network was 0.75 oz./sq. yard and the tensile strength in the machine direction was 8 lbs./inch.

What we claim and desire to protect by Letters Patent is:

1. A method of making network structures comprising:
   forming in a sheet of crystallizable thermoplastic polymer a plurality of parallel continuous ribs extending from one side of the sheet to the other at an angle to the longitudinal axis of the sheet with webs of reduced thickness interconnecting adjacent ribs, said ribs having a thickness at least three times the thickness of said webs, and said ribs having a cross-sectional area at least two times the cross-sectional area of said webs;
   crystallizing said sheet to at least a 30 percent crystalline content; and
   drawing said sheet in at least a first direction which is between about 45° and 70° to the longitudinal axes of said ribs without allowing a substantial reduction in width and then drawing in a second direction perpendicular to said first direction to orient said ribs and webs and to split said webs into fibrils and open said sheet into a uniform network structure having continuous ribs interconnected by fibrils.

2. A method of making network structures as set forth in claim 1 wherein said ribs are formed at an angle of between about 40° and 70° to the longitudinal axis of said sheet and said first direction of draw is parallel to said longitudinal axis of said sheet.

3. A method of making network structures as set forth in claim 1 wherein said ribs are formed at an angle of between about 40° and 70° to the transverse axis of said sheet and said first direction of draw is parallel to said transverse axis.

4. A method of making network structures as set forth in claim 1 wherein said ribs are oriented substantially along their longitudinal axes and said fibrils are oriented substantially along their longitudinal axes.

5. A method of making network structures as set forth in claim 1 wherein said first direction draw is at least 2X and is parallel to the longitudinal axis of said sheet.

6. A method of making network structures as set forth in claim 1 wherein said first direction draw is at least 2X and is perpendicular to the longitudinal axis of said sheet.

7. A method of making network structures as set forth in claim 1 wherein said first direction draw is at least 2X and said second direction draw is no greater than about 4X.

* * * * *